Patented Oct. 15, 1940

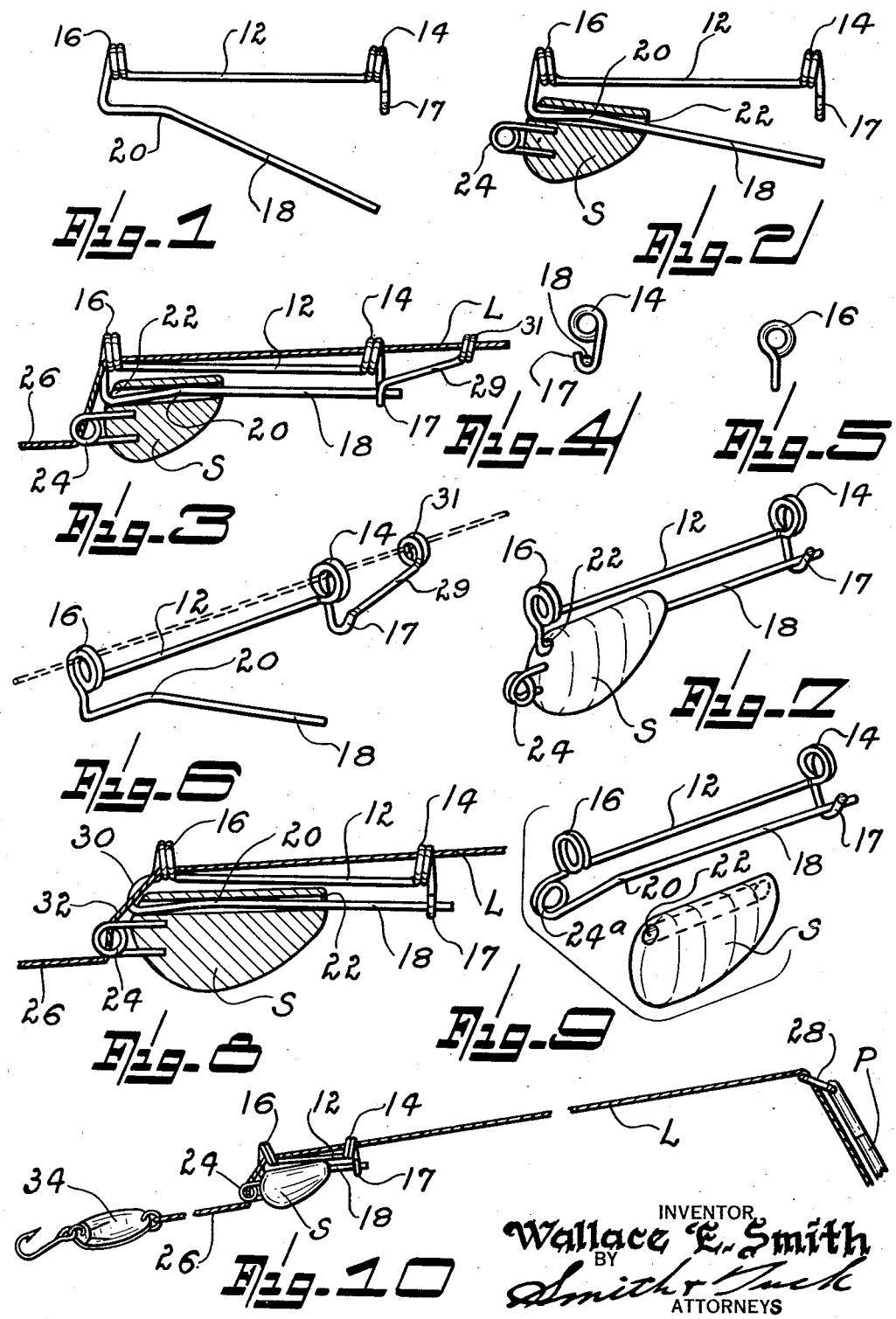

2,217,972

UNITED STATES PATENT OFFICE 2,217,972

SLIP SINKER

Wallace E. Smith, Seattle, Wash.

Application July 8, 1938, Serial No. 218,195

4 Claims. (Cl. 43—52)

My present invention relates to the art of fishing sinkers and more particularly to a slip sinker.

In fishing, where conditions change from time to time, it is desirable to have a sinker arrangement such that different weights of sinkers may be quickly and easily attached to the fishing line. In the past this has been accomplished by providing sinkers of different weights which were inserted between the line and the fishing leader. This required that each time a sinker weight was changed to allow fishing at different depths, as in trolling, it was necessary to cut the line and then to insert the new sinker in the tackle rig. This is objectionable in that it requires a certain amount of time to make a change and, normally, there is a wastage of line; particularly is this true when metal lines are used.

When trolling it has been found that the sinker, being a relatively large mass, should be attached to the fishing line at a considerable distance from the lure usually about twenty feet. There are two reasons for this; one is to prevent the fish from being attracted to the sinker or being frightened by the sinker producing as it does eddy currents as it is pulled through the water.

When, however, a sinker of the conventional type is so inserted in the fishing line it is impossible to reel in the line so that the fish can be under the spring tension of the pole and so that the fisherman has full control of his line to guard against surges of the fish, because these surges normally occur as the fish is brought along the side of the boat in a position to net or gaff. With the older type of equipment it was necessary to grasp the line at the sinker and handle it as a hand line during the very period of playing the fish when the maximum danger of loss occurs.

In my present sinker arrangement I have overcome both of these faults as encountered in the sinkers observed to date. I have provided first for the easy substitution of a fishing weight of a different size without in any way interfering with the normal fishing line and I have provided releasing means so that as the sinker is brought up to the tip of the pole or when the fish strikes the lure the sinker is released from its position part way up the line and is free to run down the line to the lure. This then gives the fisherman a chance to play a fish against the spring of the pole and with his reel, so that he can take in or let out line as the maneuvers of the fish indicated desirable.

Other and more specific objects will be apparent from the following description taken in connection with the accompanying drawing, wherein Figure 1 is a side view of my weight supporting and attaching means.

Figure 2 is a view similar to Figure 1 but showing a weight in the first step of attaching it to the carrier.

Figure 3, a modified form, shows the same parts, with the addition of a weed guard, as in Figure 2 but in their final position, in readiness for use.

Figure 4 is a front view of the carrier of Figure 1 looking along the line.

Figure 5 is a rear view of the carrier looking forward along the line.

Figure 6 is a perspective view of the carrier shown in Figure 3.

Figure 7 illustrates, in perspective, my carrier with the fishing weight in place thereon.

Figure 8 is similar to Figure 3 excepting a larger weight is shown on the carrier, and the form of carrier is somewhat modified so as to permit the sinker to come to rest further back on the carrier.

Figure 9 is a perspective view of a modified form of carrier together with a modified form of weight adapted for use therewith.

Figure 10 is a view showing the normal hook-up of my weight and carrier with a fishing pole and lure.

Referring to the drawing, throughout which like reference characters indicate like parts, 12 designates the bar of my carrier. This should be of sufficient length so as to exceed the length of any sinker that may be used with a particular size carrier. At opposite ends of bar 12 are the line guides 14 and 16. These are normally formed by winding the wire so as to form loops, preferably so that two or more turns of wire will ride upon the line to so distribute the weight on the line that there will be no chafing of the same. The leading guide as 14 has formed as part of it the downwardly extending hook member 17 which serves in much the same manner as the keeper of a safety pin. The line guide at the opposite end of bar 12 is formed somewhat after the fashion of the pin of a safety pin having a relatively long rod portion 18 which is adapted to normally spring outwardly from bar 14 after the showing of Figure 1 and to be engaged when desired on pin hook 17 after the showing of Figures 3, 4, 7, 8, 9, and 10. In order to secure sinker S in place and prevent its twisting on rod 18 I prefer to form the rod with a relatively sharp bend at 20 so that as the sinker is threaded on to the rod the through opening 22 in the sinker will tend to flatten this bent portion after the showing of Figures 2, 3, and 8, so that considerable frictional resistance will be set up which will tend to hold the sinker in a definite position.

In order to fully follow the teachings of my present invention sinker S is preferably provided with a tight coiled line clamp member 24 which normally consists of a double coil with its ends embedded in sinker S which is normally made of heavy metal as lead. When so arranged, the line L, after the showing of Figure 3, passes through guide members 14 and 16 and then slantingly down so as to engage clamp 24. It will then be apparent it is believed that if the fish should strike the lure, which is attached to end 26 of line L, it will pull the line out of clamp member 24. If, however, this should not occur as soon as guide 14 abuts the tip 28 of pole P, by continuing to reel in, the carrier will be pushed backwardly along the line and will in this way pull the line out of engagement with clamp 24 so that under either condition the sinker and its carrier will be free to slide down the line until it engages the lure thus making it possible for the fisherman to fully reel in his line.

In Figures 3 and 6 I have illustrated a modified form of carrier which is similar to the form shown in Figure 1, but has the addition of a weed-guard. The end of hook member 17 of Figure 1 is extended to the right as shown in Figures 3 and 6 to form the inclined bar 29. This bar 29 has a line guide 31 formed at its free end which is similar in construction to line guides 14 and 16, differing in these in only that the diameter of the guide loop 31 is slightly smaller than those of guides 14 and 16. This weed-guard is used to protect the carrier against entanglement of weeds and the like when trolling.

In Figure 8 I have illustrated a modified form of carrier in which rod 18 while otherwise having the same characteristics of the form shown in Figure 1, is provided with a rearwardly extending bend 30 so that the sinker can come to rest in a position further to the rear of guide 16 than in the form previously shown. This permits the bight of line at 32 to assume a smaller angle so that greater strain can be put on the line without drawing it out of clamp member 24. This is of advantage in certain types of fishing particularly where lures, or baits, of considerable size are used which might otherwise tend to pull the line out of the clamp.

In Figure 9 I have illustrated a further modification of a carrier together with a modification in the sinker itself. In this form the clamp member 24 is removed from the sinker and formed as part of the carrier as indicated at 24a. The general construction of the carrier is otherwise the same as those previously shown.

In Figure 10 I have illustrated the normal hookup of a set of gears using my carrier and sinker arrangement. The line has been broken and it is to be assumed that the distance between the lure 34 and the carrier will be approximately 20 feet for normal type of fishing and that normally a leader portion would probably be employed.

The foregoing description and the accompanying drawing are believed to clearly disclose a preferred embodiment of this invention but it will be understood that this disclosure is merely illustrative and that such changes in the invention may be made as are fairly within the scope and spirit of the following claims.

I claim:

1. In a slip-sinker for a fishing line, the combination with a carrier having spaced line guides, of a sinker, means detachably securing the sinker on the carrier, and means mounted on the sinker for detachably fastening the slip-sinker to the line, said last named means releasing the sinker upon draft on the line.

2. In a slip-sinker for a fishing line, the combination with a carrier having spaced line guides, a spring-pin, and a keeper for the pin, of a sinker having an opening and mounted on the pin, means for retaining the sinker on the pin, and a clamp on the sinker releasable under draft on the line for detachably fastening the slip-sinker to the line.

3. In a slip-sinker for a fishing line, the combination with a carrier having spaced line guides, a spring pin having a bend therein, a keeper for the pin, and an obliquely extending weed-guard at the forward end of the carrier, of a sinker having an opening therethrough and frictionally mounted on the bend of the pin, and a clamping device on the sinker releasable under draft on the line for detachably fastening the slip-sinker to the line.

4. In a slip-sinker for a fishing line, the combination with a wire-carrier having spaced line guide loops, one of said loops terminating in a keeper-hook and the other loop terminating in an obliquely extending portion, and a spring-pin having a flexed portion adjacent the obliquely extending portion, of a sinker having an opening therethrough and frictionally engaged on the flexed portion, and a spring clamping-loop on the sinker for detachably fastening the slip-sinker to the line.

WALLACE E. SMITH.